Figures 1, 2:
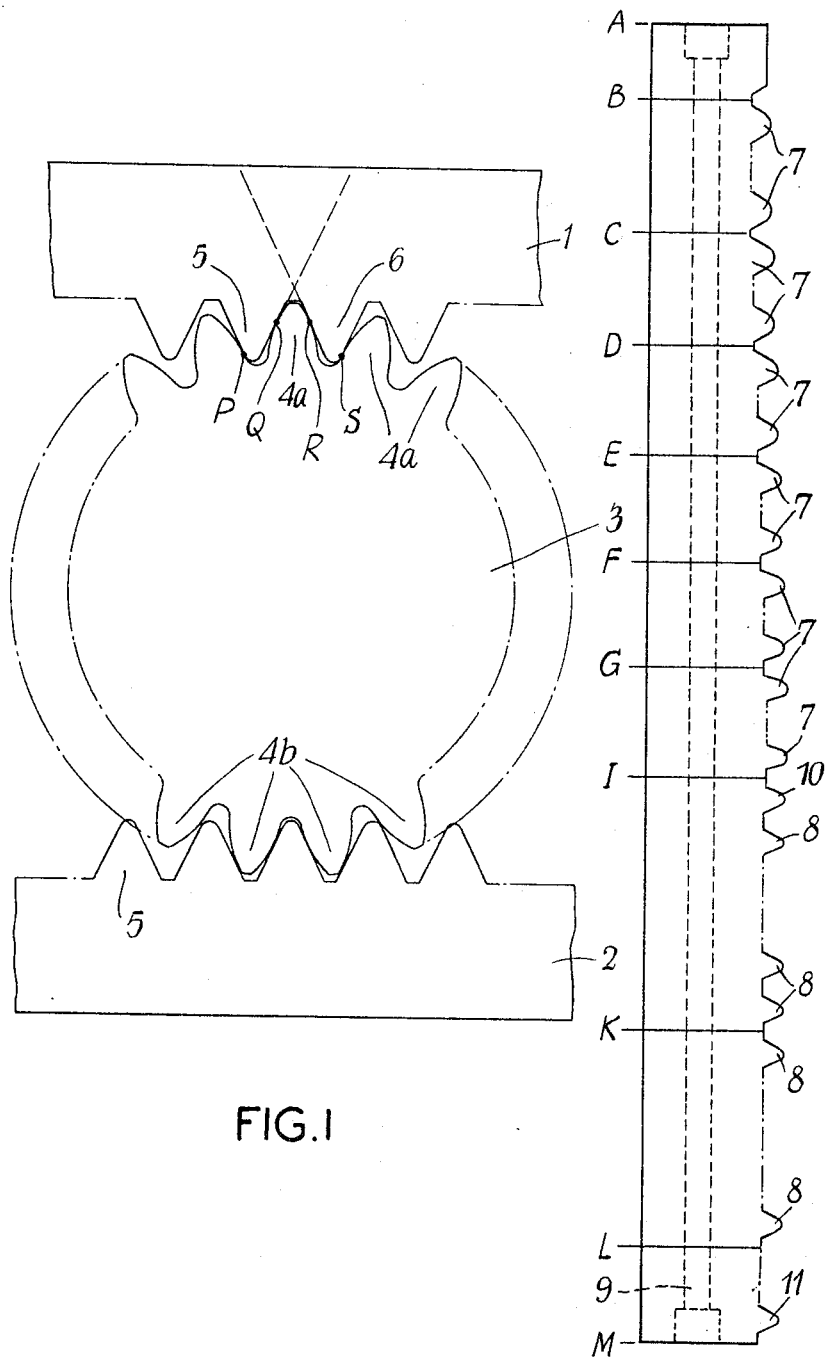

Nov. 8, 1966   R. C. CLERK   3,283,559
MANUFACTURE OF INVOLUTE TOOTHED GEAR WHEELS
Filed March 12, 1962

INVENTOR
ROBERT CECIL CLERK
BY *Munn and Sunley*
ATTORNEYS

United States Patent Office 3,283,559
Patented Nov. 8, 1966

3,283,559
MANUFACTURE OF INVOLUTE TOOTHED
GEAR WHEELS
Robert Cecil Clerk, Richmond, England, assignor to Formroll Limited, Reading, England
Filed Mar. 12, 1962, Ser. No. 179,126
Claims priority, application Great Britain, Mar. 13, 1961, 9,182/61
6 Claims. (Cl. 72—469)

This invention relates to the manufacture of involute toothed gear wheels.

It is well known that in the manufacture of involute toothed gear wheels the initial forming of the tooth whether by hobbing, planing or generating, or by casting, sintering, plastic forming or roll forming, sometimes leaves room for improvement as to surface finish and perfection of form. This is usually corrected by shaving or grinding, both of which operations are relatively slow processes which do nothing to improve the surface structure of the work material, and indeed impair it.

The object of the present invention is to provide a means of finishing a part finished, or poorly finished involute gear or spline in a manner which is quick in achievement and which so swages the surface material of the teeth as to refine and improve its structure and finish, and so provide a profile better adapted to cooperate with another compatible gear wheel.

Accordingly the invention provides a method of finishing a part finished or badly finished gear wheel blank comprising rolling the blank between a pair of oppositely directed and oppositely moving forming racks, the teeth of which are formed to a pressure angle appreciably greater than the pressure angle of the partially formed teeth of the blank being worked, the increase in pitch between the teeth of the forming rack and the teeth of the blank being worked being substantially inversely proportional to the cosines of the pressure angles of the teeth of the gear being worked and the rack teeth.

The term substantially as used in the preceding paragraph implies pressure angles to within 4° to 5° of an ideal pressure angle.

The pressure angle of the teeth of the forming racks may conveniently approximate to the mean of the basic pressure angle of the blank being worked and one half the angle included between the tangents to the obversed involutes of any tooth of the gear wheel blank at the tip of such a tooth. This ensures that all points of the involute face other than the pitch point corresponding to the increased pressure angle will be subjected to a sliding or swaging action. Also this ensures that when the tip of one face is being worked, the obverse face is being worked and therefore supported at or near the pitch point.

Incidental advantages arising from the wide pressure angle of the forming teeth affect both the teeth being formed and the work teeth; the formed teeth by virtue of the fact that the wide base conferred by the wide angle will provide greater working accuracy due to minimized strain deflections, and the formed teeth will have enhanced life due to the lower and non-reversing stress range. The work teeth will be subjected to very much reduced bending stresses (and corresponding accuracy inhibiting strain deflections) as the tips of the gear teeth are swaged and therefore support the work teeth on both sides simultaneously and unsupported bending loads are applied to a tooth only in the region of and below the pitch line of the worked gear tooth. Also, as the tips of the wide angle forming teeth will have only a very narrow crest, this can be capped by a small enveloping radius well adapted to swage the root space between the teeth being formed and so enhanced the strength of the final gear teeth.

The forming teeth on each rack may be in groups or cascades of teeth numbering at least half the number of teeth on the gear wheel being finished, so that by slight changes of pressure angle and accompanying pitch in successive cascades the unswaged pitch lines from one cascade are worked over by previous or successive cascades. The final cascade may be tapered off by an amount equivalent to the strain deflection inherent in the machine so as to unload the working system gradually without shock.

The invention equally includes a rack substantially as described above.

These and other parts of the invention are embodied in a preferred form of finishing mechanism which will now be described by way of example with reference to the accompanying drawings in which:

FIG. 1 is a schematic diagram of a part finished blank between two rack segments, FIG. 2 is a schematic diagram of a complete rack.

For the sake of clarity only engaged teeth of the racks 1 and 2 and of the blank 3 are shown in FIG. 1, though in practice the rack teeth will number at least half the number of teeth on the blank which is being finished.

In the drawing, the rack 1 and the upper half of the blank 3 are shown half a pitch ahead of the lower half of the blank 3 and the rack 2, though the teeth 4 and 4b are of a size corresponding to a 20 tooth rack in which the basic pressure angle of the blank teeth 4a and 4b is some 20°.

Considering the forming teeth 5 and 6 of rack 1 which are shown located symmetrically about the central vertical tooth 4a, each forming tooth 5 and 6 makes contact with this tooth 4a and also with the appropriate adjacent tooth 4a.

The included tangent angle at the tip of a tooth is defined by the lines (shown dotted) associated with each pair of tangent points PQ and RS.

If there were N teeth 4a on the blank 3 and correction coefficient to be applied were C then half the included tangent angle approximates to $$\cos{-1}\frac{N \cos 20°}{N+2+2C} - \sqrt{\frac{N}{40}} \times 1\tfrac{1}{2}°$$

or where $N=20$ and $C=0.2$ some 32°.

The pressure angles of the forming teeth of the rack 1, and also of the rack 2, are found by taking the mean of this half angle and the basic pressure angle of the teeth being formed on the blank 3 (20°), i.e., some 26°.

The lower half of the drawing illustrates how all points of the involute face of each tooth 4a, 4b other than the pitch point corresponding to the increased pressure angle are subjected to a sliding or swaging action.

One form of complete rack is illustrated in FIG. 2, in which cascades of narrow angle teeth 7 of segments BC, CD, DE, EF, FG and GI are used to shape a blank into a crude gear form, and the teeth 8 of segments IK and KL are used to complete the shaping of the gear form. The various segments may be constructed independently and be bolted together by a long bolt 9.

The initial tooth 10 of section IK is a change over tooth between the cascades of teeth 7 and the cascades of teeth 8.

The teeth 11 of the final segment LM are for unloading the racks and will be referred to hereinafter.

When successive cascades IK, KL of forming teeth are used on a compound rack, slight changes of pressure angle and accompanying pitch in successive cascades will ensure the working of the unswaged pitch lines that result from other cascades.

The final cascade LM may be tapered off by an amount equivalent to the strain deflection inherent in the machine so as to unload the working system gradually without shock.

The tips of the wide angle forming teeth will have only a narrow crest, and this can be capped by a small enveloping radius, adapted to swage the root space between the teeth being formed and so enhance the strength of the final gear teeth.

Incidental advantages arising from the wide pressure angle of the forming teeth affect both the teeth being formed and the work teeth; the formed teeth by virtue of the fact that the wide base conferred by the wide angle will provide greater working accuracy due to minimized strain deflections, and the formed teeth will have enhanced life due to the lower and non-reversing stress range. The work teeth will be subjected to very much reduced bending stresses (and corresponding accuracy inhibiting strain deflections) as the tips of the gear teeth are swaged and therefore support the work teeth on both sides simultaneously and unsupported bending loads are applied to a tooth only in the region of and below the pitch line of the rack.

It is to be understood that the invention is not restricted to the exact details shown and described but embraces such modifications as come within the ambit of the accompanying claims.

I claim:

1. A rack for finishing a part finished or badly finished gear wheel blank, by rolling the blank between a pair of such racks oppositely directed and oppositely moved, the teeth of which are formed to a pressure angle appreciably greater than the pressure angle of the partially formed teeth of the blank being worked, the increase in pitch between the teeth of the forming rack and the teeth of the blank being worked being substantially inversely proportional to the cosines of the pressure angles of the tooth of the gear being worked and the rack teeth.

2. A rack according to claim 1 in which the actual pressure angle of the forming teeth is within 5° of the appropriate ideal pressure angle.

3. A rack according to claim 1 in which the pressure angles of the forming teeth conveniently approximate to the mean of the basic pressure angle of the blank being worked and one half the angle included between the tangents to the obversed involutes of any tooth of the gear wheel blank at the tips of such tooth.

4. A rack according to claim 1 in which the tips of the forming teeth are radiussed to swage the root space between the teeth being formed.

5. A rack according to claim 1 having a plurality of cascades of forming teeth and in which the teeth of each cascade number at least half the number of teeth on the blank.

6. A rack according to claim 1 having a plurality of cascades of forming teeth and in which at least one later acting cascade of teeth has a pitch and pressure angle chosen to work unswaged pitch lines formed by earlier acting cascades of teeth.

References Cited by the Examiner
UNITED STATES PATENTS

| | | | |
|---|---|---|---|
| 616,648 | 12/1898 | Beale. | |
| 1,642,179 | 9/1927 | Schurr. | |
| 2,788,567 | 4/1957 | Stibitz | 29—159.2 X |
| 2,994,237 | 8/1961 | Pelphrey | 72—469 |
| 3,015,243 | 1/1962 | Drader | 72—469 |

CHARLES W. LANHAM, *Primary Examiner.*

R. D. GREFE, H. D. HOINKES, *Assistant Examiners.*